United States Patent Office 3,049,578
Patented Aug. 14, 1962

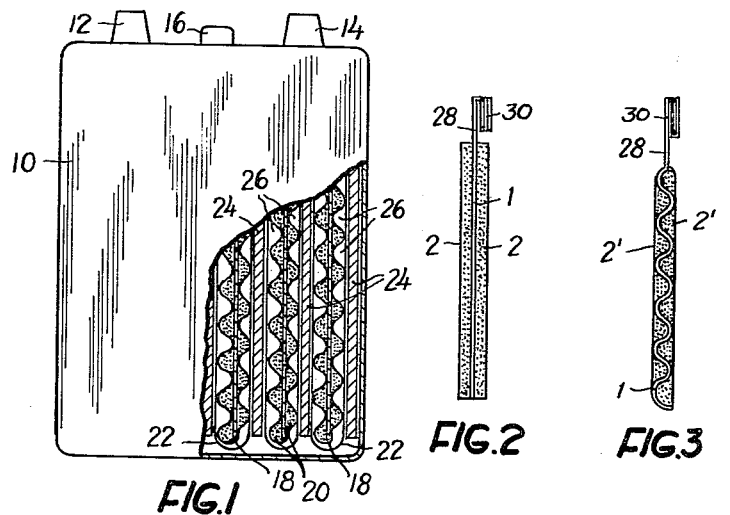
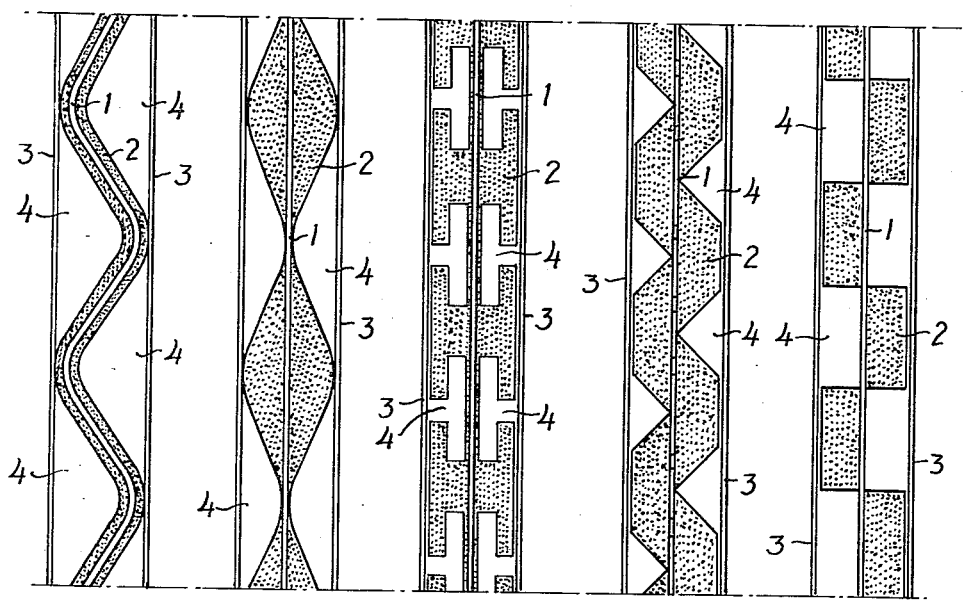

3,049,578
ALKALINE STORAGE BATTERY WITH SEMI-PERMEABLE SEPARATORS
Erik Jönsson and Sven Uno Falk, Oskarshamn, Sweden, assignors to Svenska Ackumulator Aktiebolaget Jungner, Stockholm, Sweden, a corporation of Sweden
Filed Mar. 12, 1956, Ser. No. 570,893
Claims priority, application Sweden Mar. 11, 1955
1 Claim. (Cl. 136—30)

It is previously known to make sintered electrodes for alkaline batteries in such manner that nickel or iron powder is sintered on a substructure or thin sheet-metal or a fine-meshed net, whereupon the porous sinter frame thus formed is impregnated with active material in the form of hydroxide.

Likewise, it is known with respect to so-called silver-zinc storage batteries and primary cells to sinter a porous silver body about silver filaments or nets, the porous sinter thus formed also serving, after electrolytic forming, as an active material in the positive electrode.

It has been found, however, that the last-mentioned construction of electrodes is unsatisfactory with high specific loading currents, in so far as considerable voltage drops are experienced in the interior of the electrode.

An appreciable improvement in said respect is attained by the present invention, according to which the positive electrode comprises a thin silver foil or sheet-metal element of silver having a layer of silver powder sintered or pressed to one or both sides thereof. The thickness of said foil or element is about 0.05–0.2 mm. Upon forming one may regard the silver powder, substantially in its entirety, as an active material and the foil as a carrier and current lead. In the manner described, electrodes are obtained with extremely low internal voltage drops and consequently with very favourable high loading properties, such being particularly the case, if prior to the sintering operation the surface area of the carrier has been enlarged by sandblasting, pickling or otherwise, so that a still larger contact surface and a more intimate contact between the carrier and the active material is attained. In most cases, a sinter layer is preferably applied to both sides of the plate, but in exceptional cases, outer plates, it may be found to be advantageous to do this on one side only.

Sometimes it may also be found to be favourable to provide the foil with perforations prior to the sintering operation, inasmuch as this will facilitate the diffusion of electrolyte within the electrode pack, this being particularly the case, if it is desired to provide for electrolyte or water filling in the shortest possible time.

In storage battery cells with an alkaline electrolyte the notion would further be cherished that the electrolyte did not participate in the cell reactions, but this is only a relative truth, it being understood that the total concentration of the electrolyte is not influenced by the condition of charge, whereas in connection with a discharge, for example, water is still consumed at the positive electrode, which consumption is compensated by a corresponding formation of water at the negative electrode. The net result of this is that the total electrolyte concentration remains unchanged, but—and this is important—this mechanism implies that the local changes of the concentration of the electrolyte can be compensated at the same rate at which they present themselves or, at any rate, that there is always about the positive electrode the necessary quantity of water for the complete discharge of the electrode at the actual strength of current. In alkaline cells with the separation effected by means of a few simple and narrow plastic rods, bands or the like this does not offer any difficulties whatsoever; the electrolyte can circulate freely and unimpededly and rapidly equalize differences in concentration appearing during the discharge.

However, a more recent tendency of the development, particularly in cells with sintered plates, has involved, for the purpose of providing for a greater capacity per unit of volume of the battery, a reduction of the electrode distance to such an extent that the abovementioned simple separation does no longer give any perfect insulation, inasmuch as small silt particles and the like may readily bridge the inconsiderable space between electrodes of opposite polarities.

One would then endeavour to use separators of a thin plastic fabric or of microporous plastic cellophane or the like, which does not involve any appreciable internal increases of the resistance while still entailing with respect to microporous and semi-permeable materials that the discharging properties are highly impaired with a high current load, if special measures are not taken with a view to reducing the effect thereof. Said impairment depends on the very fact that the rate of diffusion of the electrolyte through the relatively dense separator—against a flow of liquid—becomes too low to be capable of equalizing the changes of concentration. In cells having silver and zinc as active materials, where a semipermeable separation is absolutely necessary, the positive silver electrode may be surrounded by more or less closed bags of such material.

With respect to the two types of cells last described, that is to say ordinary alkaline cells with sintered electrodes and such of the silver-zinc type, it has been suggested to surround the positive electrode by a layer of an open fabric of plastic or glass or the like; ordinarily, however, the object in view has been another one, namely, to protect the separator against attacks by the oxidizing positive electrode. However, it appears to be highly probable that the improved properties of cells with such a fabric next to the positive electrode are to be referred to the fact that the open fabric brings about rather a considerable additional electrolyte space adjacent to the outer surface of the electrode where it is best needed at discharges with a strong current.

However, a few considerable drawbacks involve an additional fabric webbing as per above, one of them being that the internal resistance is increased more or less depending on the closeness of the fabric and its wetting properties relatively to the electrolyte and another being that the manufacturing cost becomes higher for every additional component added to the cell, both with respect to materials and, above all, regarding work.

A better result, and at the same time lower manufacturing costs, will be obtained in alkaline cells of the silver-zinc type according to the present invention, if the additional fabric layer is replaced by a corrugation or channelling of the actual electrode, in a manner such that additional electrode spaces are formed between the wavy surface of the electrode and the generally plane separator.

A further improvement in the desired direction will also be obtained by the effective external surface of the electrode being increased by the corrugation instead of reduced—even if rather inconsiderably—as in connection with fabric webbings, by the fact that the fabric screens off certain parts of the electrode. Considering cells with thin plates and intended for high current loads, the capacity would be increased as much as 10–20 times by the surface enlargement in view with otherwise the same cell construction and the same conditions of load, the cell voltage having also been increased considerably at the same time. Entirely new possibilities have been opened hereby for the construction of very compact cells intended for high loads.

The invention will be explained further hereinafter with reference to the accompanying drawings, in which FIGURE 1 is an elevation of an electric cell, a part of the container having been removed to show the electrodes therein, FIG. 2 is a side elevation of a sintered electrode according to one embodiment of the invention, and FIG. 3 is a side elevation of an electrode according to another embodiment, and FIGURES 4, 5, 6, 7 and 8 each is a side elevation of an electrode and adjacent separators for alkaline cells according to the invention to illustrate various types of electrolyte spaces.

In FIG. 1 the container of the alkaline cell is denoted with 10, the pole bolts with 12, 14 and a vent plug with 16. Each positive electrode comprises a thin sheet metal element or foil 18 of silver carrying active material of silver powder sintered or pressed to form layers 20 at both sides thereof. Each positive electrode is enclosed in a bag 22 of semipermeable material to form separators between the positive electrodes and zinc plates 24 forming the negative electrodes. The layers 20 have an undulated surface to form spaces 26 for the electrolyte as will be described more in detail in connection with FIGURES 4–8.

The positive electrode illustrated in FIG. 2 comprises a plane foil or carrier of silver 1 and plane sintered or pressed layers 2.

If it is desired to produce somewhat thicker electrodes than is generally the case in applying the invention, one may preferably corrugate the sheet metal carrier 1 prior to sintering, so that the "amplitude" of the corrugation approximately corresponds to the total thickness of the desired electrode as shown in FIG. 3, the active material 2' then consequently being received in the channels of the corrugation, in connection with which method the proportioning of the silver powder prior to sintering is also considerably facilitated.

The sheet metal or foil used as a base material is preferably also formed into contact tags 28 to lead off current from the electrode, and may then, for instance, be folded into two, three or more layers 30, so that a larger conductor area is obtained with a reduced electric resistance with the attainment of a firmer and stronger structure, as illustrated in FIGURES 2 and 3.

In FIGURES 4–8 of the drawing, the perforate or imperforate carrier of sheet metal has various layers of electrode paste 2. Separators 3 are shown on either side of the carrier. Electrolyte spaces 4 are formed between the separators and the sides of the carrier 1.

In the construction according to FIG. 4, the sheet metal plate is corrugated, the electrode paste 2 forming uniformly thick layers on either side of the plate 1. With respect to the manufacture such a construction is of the greatest advantage in sintered electrodes for alkaline storage batteries of the type referred to above. The manufacture of sintered electrodes of this type may proceed by making bands of silver sinter on a foil or sheet-metal of silver, for instance through continuous rolling and subsequent sintering. The corrugation of the band to the shape shown or to some similar shape may then be easily effected.

In the embodiment illustrated in FIG. 5 and FIG. 7, the electrode layer 2 on either side of the foil 1 is of a varying thickness and may attain the illustrated form by rolling or pressing. In FIG. 5, the side surfaces of the electrode are wave-shaped, and in FIG. 7 they are channelled. The channeling may form parallel straight streaks in one direction only but also streaks in directions crossing one another, so that the surface has the appearance of a check or waffle pattern.

In the embodiment illustrated in FIG. 8, the electrode paste takes the form of ribs or portions of a rectangular section, the same being separated by spaces of a similar shape for the formation of the electrolyte spaces 4. In this type of electrodes, the paste may also be applied by rolling or pressing.

The embodiments shown in FIGS. 5, 7 and 8 are particularly suitable for the production of sinter electrodes.

The form illustrated in FIG. 6 is more complicated, in that the electrode paste 2 forms ribs or portions, which are approximately T-shaped in cross section. The electrolyte spaces 4 have a similar form. Through this construction, however, the advantage of a particularly large electrode surface is attained.

Although the pattern formed by the electrode paste through the corrugation or ribbing may be oriented so that the electrode spaces form channels in arbitrary directions—vertically, horizontally or obliquely—and may also be double-directed in a check or waffle configuration, it is in practice most advantageous in the plurality of cases to use a vertical orientation. This is to be preferred inter alia for the reason that filling of electrolyte and water is facilitated thereby.

Electrodes of the type described may find use both in storage batteries and in primary batteries, in which a particularly low internal resistance is aimed at.

What we claim is:

An electric cell of the silver-zinc type with alkaline electrolyte, comprising positive electrodes of thin sheet metal element of silver having a layer of fine grain silver powder secured on to it, negative electrodes containing zinc active material, and a separator between electrodes of opposite polarity, characterized by the combination of the features of the separators being of a semi-permeable character and surrounding the positive electrodes in the shape of closed bags and of the surface of the positive electrodes being provided with elevated parts and with depressed parts, thus providing space for electrolyte between said positive electrodes and said semi-permeable separators in order to make said positive electrodes self-supporting as to electrolyte inside said semi-permeable separator bags.

References Cited in the file of this patent

UNITED STATES PATENTS

| | | |
|---|---|---|
| 532,128 | Willard | Jan. 8, 1895 |
| 2,594,709 | Andre | Apr. 29, 1952 |
| 2,594,713 | Andre | Apr. 29, 1952 |
| 2,610,219 | Yardeny | Sept. 9, 1952 |
| 2,636,059 | Garine | Apr. 21, 1953 |
| 2,672,496 | Lubeck | Mar. 16, 1954 |
| 2,681,375 | Vogt | June 15, 1954 |
| 2,719,874 | Chapman | Oct. 4, 1955 |
| 2,724,733 | Hagspihl et al. | Nov. 22, 1955 |
| 2,776,331 | Chapman | Jan. 1, 1957 |
| 2,838,590 | Garine | June 10, 1958 |

FOREIGN PATENTS

| | | |
|---|---|---|
| 12,313 | Great Britain | 1898 |
| 14,924 | Great Britain | 1900 |
| 692,731 | Great Britain | June 10, 1953 |